United States Patent [19]
Driggs

[11] 3,843,813
[45] Oct. 22, 1974

[54] METHOD AND APPARATUS FOR TREATING EGGS

[75] Inventor: Leslie W. Driggs, West Sand Lake, N.Y.

[73] Assignee: Nutrionics Machine Corporation, Hoosick Falls, N.Y.

[22] Filed: May 24, 1973

[21] Appl. No.: 363,333

Related U.S. Application Data
[62] Division of Ser. No. 54,969, July 15, 1970.

[52] U.S. Cl. .............................. 426/241, 426/521
[51] Int. Cl. ......................... A23b 5/00, A23l 1/32
[58] Field of Search ............ 99/113, 195, 196, 224, 99/221, 177, 217, 161; 426/241, 243

[56] References Cited
UNITED STATES PATENTS
2,473,041  6/1949  Urbain et al. ..................... 99/221
3,494,723  2/1970  Gray ................................. 99/221

*Primary Examiner*—A. Louis Monacell
*Assistant Examiner*—R. A. Yoncoskie
*Attorney, Agent, or Firm*—Cushman, Darby & Cushman

[57] ABSTRACT

Treating hard cooked poultry eggs to pasteurize the eggs and to reduce the green coloration of portions of eggs which have such green coloration or are subject to green coloration development, comprising subjecting the hard cooked eggs to radio frequency energy in the range of about 50 to 100 megahertz to raise the temperature of the eggs to about 180°F.

3 Claims, 4 Drawing Figures

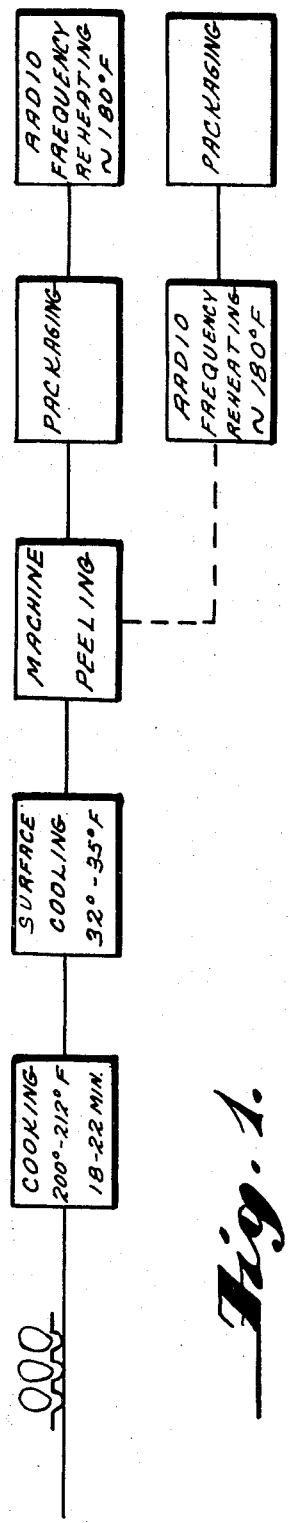
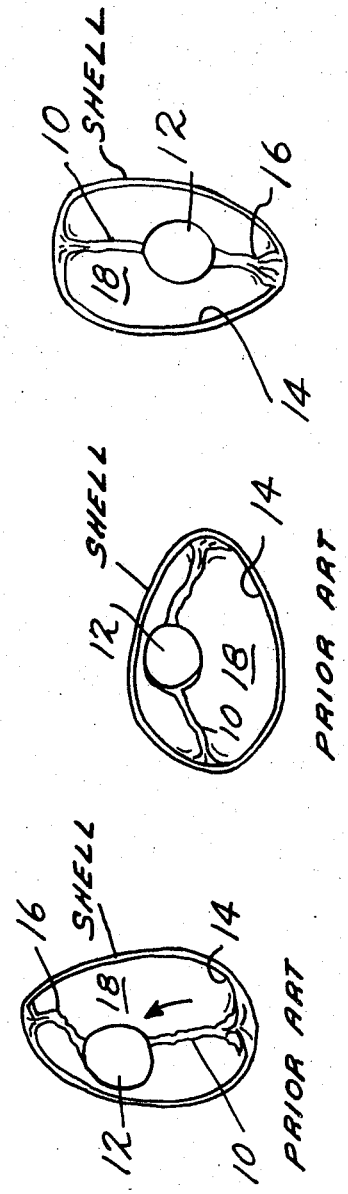

METHOD AND APPARATUS FOR TREATING EGGS

This is a division, of application Ser. No. 54,969 filed July 15, 1970.

BACKGROUND AND BRIEF DESCRIPTION OF INVENTION

This invention relates to improved methods and apparatus for treating poultry eggs so that such eggs can be made more readily available for consumer usage. More specifically, the invention provides for novel cooking and peeling of eggs that substantially eliminate hand labor and other problems that have been associated with egg handling and storage in the past. In this specification and its claims, reference will be made to "hard cooked" eggs and "peeling" of eggs. The phrase hard cooked is intended to describe what is more commonly known as a hard boiled condition for an egg wherein the yolk and white are firm and non-liquid. The term peeling is intended to describe the removal of the shell from the egg.

In recent years there has been an overall decline in per capita egg consumption in the United States. In addition, the use of hard cooked eggs has become less attractive to the food service industries, mainly because of problems involved in handling, storing, and preparing such eggs for ultimate use and consumption. At the present time, hard cooked eggs are still peeled by hand, and this represents an inefficient and inconvenient treatment requirement that discourages the use of such eggs in large quantities by food service industries. Also, eggs themselves have changed through the years as geneticists have bred poultry for improved egg quality and higher egg production. For example, it is known that eggs of higher quality have a lower pH for their whites and shell membranes than do eggs of lower quality and that such higher quality eggs are more difficult to peel. Conversely, it has been recognized that lower quality eggs have a higher pH and are easier to peel. Certain prior art efforts in the art of egg peeling have concentrated on adjusting the pH of eggs to facilitate peeling, but these efforts have not fully satisfied the need for hard cooked eggs that are easy to peel. In addition, breeding practices have inadvertently resulted in a change in chaleza structures in eggs. It has been found that the chaleza structures at the larger ends of eggs are now considerably smaller or weaker than those of eggs from earlier strains of birds, and this weakness permits greater yolk movement in certain directions within the shell. As a result, the present day practice of cooking eggs while they are lying on their sides, or positioned with their small ends directed upwardly, produces a high percentage of eggs which have yolks that are considerably off center and even almost protruding through the white of the egg, thereby making for even more difficult peeling and very poor appearance of the final product.

The present invention is directed to improvements in methods and apparatus for treating eggs so that eggs can be hard cooked, peeled, and stored more economically and more efficiently. Various parts of the overall invention will be discussed under separate headings below:

a. Cooking:

It has been discovered that eggs can be more readily peeled if the yolk position within a cooked egg is away from the egg shell so that a layer of egg white completely surrounds the yolk. This positioning of the yolk is essential because the white part of the egg can be more readily separated from the membrane which lines the egg shell, without damaging the egg, when the yolk is surrounded by a more or less constant thickness of egg white. In the peeling of an egg, both the shell and its attached membrane are removed from the egg white. Along with this discovery, it has been found the yolk position in a cooked egg can be controlled by cooking the eggs with their smaller ends directed downwardly. This orientation of the eggs during the cooking process results in a better centralized positioning of the yolks in the eggs. As mentioned above, the chaleza structures at larger ends of eggs are becoming smaller and weaker, and it has been found that if such eggs are positioned, in accordance with past practices, with their larger ends pointed downwardly, the yolks have a tendency to float up through the egg whites until they are considerably off center. On the other hand, a positioning of an egg with its smaller end down results in a holding of the yolk in place by the stronger chaleza at the smaller end of the egg.

In the practice of the present invention, eggs are loaded onto trays with their small ends directed downwardly, and the trays are moved into a cooking zone where the eggs are hard cooked by hot water, steam, super-heated steam, or other heated fluid. Cooking is continued until the eggs are hard cooked according to known and accepted standards.

b Peeling:

As mentioned above, it has been known that the pH of an egg is an important factor with respect to the ease with which the egg can be peeled. Aged eggs have a higher pH and are easier to peel even though they are of a lower quality than fresh eggs having lower pH values. U.S. Pat. No. 3,216,828 recognizes the advantages of artificial aging to raise the pH of an egg. This is done with pre-conditioning steps which involve the use of chemical absorbers or artificial heating to about 100° F.

In contrast to such prior art attempts, the present invention provides both a method and apparatus for peeling eggs which are fresh and of a low pH. Such eggs may be subjected to pre-conditioning treatments if desired, but such treatments are not necessary when the invention is followed. In accordance with this invention, eggs can be peeled very rapidly (for example in about 3 seconds per egg) by a mechanical device which does not require any hand operations to effect peeling. This is done by subjecting each egg to surface cooling and then to a rapid flexing of the egg shell, its membrane, and the egg white. It has been discovered that pre-conditioning of an egg by cooling before peeling is of greater importance to ease of peeling than is an adjustment of pH. Also, it has been found that mechanical flexing of all surfaces of an egg results in a quick separation of a shell from the egg. Flexing of the surfaces of each egg is accomplished by subjecting the egg to mechanical forces resulting from rapid movements of the egg against the inside walls of a chamber while the chamber is being orbited about an axis without being rotated within its own axis. This results in a flexing which takes place so rapidly that the bond between the egg shell membrane and the egg white is quickly broken without disrupting the integrity of the egg white and its contained yolk.

A type of limited flexing of a portion of an egg shell is described in U.S. Pat. No. 2,713,881, but this type of flexing or cracking of a shell is not comparable to the flexing operation of the present invention. Basically, the procedure outlined in U.S. Pat. No. 2,713,881 is one of cracking a center section of a shell so that it can attach itself to an adhesive tape and be removed from the egg white, thereby leaving two cup-like portions behind for easy removal. In contrast, the procedure of the present invention is completely mechanical in nature and operates to break a bond within the egg itself so that the shell is virtually thrown off from the egg white by the rapid moving and flexing of the entire egg. Apparatus for carrying out the peeling operation includes a chamber which is cylindrical in form and which has an open top into which an egg can be placed for peeling. The chamber is tilted and orbited about an axis in such a way that the egg is subjected to violent and rapid changes in movement. The chamber is mounted within a frame which can be pivoted to a discharge position for discharging the peeled egg and its separated shell at the end of each peeling cycle. The apparatus is provided with a mechanism for allowing the chamber to be pivoted downwardly and cleaned after each egg is peeled.

c. Subsequent Treatments, Including Packaging:

Since the processing steps described above can be carried out as parts of a continuous process, a final treatment step can involve a packaging of the egg product which has been obtained by cooking and peeling the eggs. The packaging step utilizes known techniques for placing the hard cooked and peeled eggs in individual packages for storing and ultimate sale and use. An example of such a known technique involves a placing of a number of eggs in a plastic bag which can be evacuated of air and heat sealed. If desired, an inert gas can be used to replace the air in each package. A further part of the present invention provides for a re-heating of the eggs after they are peeled so as to pasteurize them and to prepare them for packaging and a long shelf life. This re-heating step may take place either prior to packaging or after the eggs are placed in a package. Re-heating is carried out at about 180° F to provide good bacteriological control of the egg product. A preferred re-heating treatment involves the use of radio frequency energy (50 to 100 megahertz) to create sufficient heat to effect pasteurization. Preferably this is done after packaging so that there will be no further contamination of the egg product after it is pasteurized. Radio frequency pasteurization also offers an additional benefit of reducing the green coloration of the white portion of a hard cooked egg (as commonly seen around the yolk area of the egg). The mechanism by which the coloration is reduced by radio frequency heating is not known but this highly desirable result has been observed by testing. Also, radio frequency heating is desirable because the white portion of the egg is more sensitive to this type of re-heating than is the egg yolk.

Thus, in accordance with a preferred processing of eggs by the present invention, the centers of the eggs are maintained at as high a temperature as possible during peeling so that re-heating can be accomplished very quickly and with lower amounts of energy. It is preferred that surfaces of the cooked eggs be flash cooled to a relatively low temperature prior to peeling so that peeling will be faciliated by the reduction in temperature of surface areas of the cooked eggs. Flash cooling, as by immersion in cold water, leaves the yolk centers of the eggs at relatively higher temperatures, and this allows a rapid re-heating and pasteurization after peeling.

These and other features and advantages of the present invention will become apparent in the more detailed discussion which follows. In that discussion reference will be made to the accompanying drawings as briefly described below.

BRIEF DESCRIPTION OF DRAWINGS

FIG. 1 is a schematic flow diagram showing a complete egg treating method for cooking, peeling, and packaging pasteurized eggs in accordance with the present invention;

FIG. 2a and FIG. 2b are sectional views of typical chicken eggs when oriented with a larger end directed downwardly or with the egg positioned on its side, in accordance with prior art practices;

FIG. 3 is a view of the type of egg shown in FIG. 2, but with its smaller end directed downwardly;

DETAILED DESCRIPTION OF INVENTION

Referring to the drawings, the invention is illustrated in terms of methods and apparatus for treating poultry eggs. The following discussion will make reference to specific methods and specific apparatus suitable for practicing the invention, but it is to be understood that the specific examples which are given represent only several of many possible ways in which the basic principles of the invention can be practiced.

FIGS. 1 – 3 illustrate basic concepts involved in the hard cooking of eggs in accordance with this invention. It is important that eggs be properly oriented with their small ends directed downwardly during the cooking operation so that a preferred positioning of yolks near the centers of the eggs will be achieved. As discussed above, and as illustrated in FIGS. 2 and 3, the chaleza structure 10 at the large end of a present day egg is greatly weakened or reduced in size due to breeding changes that have been directed to improving and increasing egg yields. the chaleza structure 10 functions to anchor a yolk 12 relative to the larger end of a typical egg configuration. An additional chaleza structure 16 serves a similar function for anchoring a yolk relative to the smaller end of each typical egg. FIG. 2 illustrates an orientation of an egg with its larger end directed downwardly for purposes of cooking the egg in accordance with known prior art practices (see for example U.S. Pat. No. 2,575,608). Because of the weakened characteristics of the chaleza structure 10, its anchoring function is greatly reduced and the fatty yolk 12 tends to float upwardly through the liquid white part of the egg until it is dislodged away from a centered position in the egg. The same type of dislodgment occurs if eggs are placed on their sides, and either way, there is a tendency for the yolk to approach and nearly touch the inner membrane of the shell. Such a dislodged positioning of a yolk in a cooked egg makes the egg more difficult to peel because there is a greater chance of breaking through a thin layer of cooked egg white, in the area of the yolk, and breaking up the integrity of the whole egg.

FIG. 3 illustrates one of the discoveries of the present invention with respect to improved orientation of eggs for cooking and peeling purposes. It has been found that a positioning of eggs with their smaller ends directed downwardly results in a very good centering of the yolk, and further, it has been found that such centering in a cooked egg is very important to successful mechanical peeling of the egg. The chaleza structure 16 which anchors the yolk to the smaller end of the egg is stronger than the opposite chaleza 10, and thus, the yolk is held suspended in a centered position by the chaleza 16 without any dislodgment of the yolk.

Referring back to FIG. 1, an overall process for cooking, peeling and packaging eggs is shown. A first step in the process involves orienting of eggs on racks or trays with their small ends directed downwardly, as discussed above with reference to FIG. 3. Then, the racks or trays are moved by known conveying means into a cooking zone where they are subjected to high temperature cooking for a sufficient time to produce a high quality hard cooked egg. The cooking is carried out in known equipment in which the eggs are heated by high temperature water, steam, super-heated steam or other heated liquid or gas. As an example of a typical cooking operation, the eggs may be cooked in a chamber in heated water at a temperature in the range of 200° – 212° F for a period of 18 – 22 minutes. The eggs may be moved through the cooking zone while being cooked, or they may be stopped in the cooking zone until cooking is completed and then moved out by a conveying device. Preferably they are maintained on racks or trays in their previously oriented positions during the entire cooking operation so that their yolks will remain centered until cooking is completed.

From the cooking zone, the eggs are moved to a cooling zone where at least the surfaces of the eggs are rapidly cooled to a low temperature to facilitate machine peeling of the eggs. Although it is a common practice to chill eggs after cooking, it has been found, in accordance with this invention, that two critical factors in the chilling step can materially aid and increase the efficiency of the peeling operation. Firstly, it has been found that the degree of chilling is important because it is possible to shock the inner shell membrane and to loosen the membrane for easier peeling if low chilling temperatures are observed. According to this invention, the cooked eggs should be subjected to temperatures at least as low as 32°–35° F. Secondly, it has been found that the temperature of a cooked egg white at the time of peeling is even more important to successful peeling than is the quality of the egg white. The colder the white, the firmer is its consistency, and this makes it easier to peel the egg with less chance of damage to the egg.

The flow diagram of FIG. 1 indicates surface cooling of the hard cooked eggs for a continuous process in which there will be subsequent re-heating and pasteurization of the egg product after peeling. The purpose in this is to maintain the center portions of the eggs at as high a temperature as possible so as to facilitate subsequent re-heating, while, at the same time, reducing surface temperatures to a sufficient level to substantially improve peeling characteristics. Thus, the step of chilling only the surfaces of eggs in a continuous process offers an advantage in bacteriological control and in subsequent pasteurization of the eggs. However, if the hard cooked eggs are not to be immediately peeled, the entire egg may be allowed to cool if desired. Surface cooling of the eggs in a continuous process can be accomplished by known devices for effecting a rapid cooling of the eggs. For example, the eggs may be conveyed from the cooking zone into a cold water bath which is maintained at a temperature within the range of 32° to 35° F for effecting rapid surface cooling of the cooked eggs. Then, the cooled eggs may be moved from the water bath to a peeling station where the shells are removed by a mechanical treatment which will be discussed in greater detail below.

After peeling, the eggs may be pasteurized and packaged in accordance with either of the sequences illustrated in FIG. 1. Preferably, the peeled eggs are placed in packages, such as thermoplastic bags which can be heat sealed and evacuated, and then pasteurized within the packages. Pasteurization comprises a re-heating of the eggs to approximately 180° F and this can be done with hot water, a heated gas, or in any other known way. With this type of treatment, shelf life for the final product is considerably improved, and the egg product may be stored for a number of weeks with normal refrigeration but without freezing. In addition, it has been found that the use of radio frequency energy (for example in the range of 50 to 100 megahertz) for re-heating and pasteurizing eggs results in greatly extended shelf life of up to thirteen weeks with normal refrigeration. Radio frequency heating is especially good for re-heating eggs in accordance with the continuous process illustrated in FIG. 1 because the egg white is more sensitive to radio frequency energy than is the egg yolk. Thus, the cooler white near the surface area of the egg is heated more rapidly, but this is a preferred sensitivity because the yolk is already heated to a certain extent from the cooking part of the process. Quite unexpectedly, it has been found that radio frequency heating of eggs has an additional benefit of reducing or even removing the green coloration which is commonly seen as a green ring around the yolk of a cooked egg. Thus, radio frequency heating produces a more desirable appearance for the final egg product, and radio frequency energy may be used to treat hard cooked eggs which have been chopped, sliced or deviled, if desired. Preferably, radio frequency heating is maintained for a sufficient time to bring internal and external temperatures of the eggs to approximately 180° F. This can be accomplished very quickly, especially where the internal portions of the eggs have been maintained at relatively high temperatures (70° to 100° F) during the previous steps of surface cooling and machine peeling.

What is claimed is:

1. A method for treating hard cooked poultry eggs to pasteurize the eggs and to reduce the green coloration of portions of eggs which have such green coloration or are subject to green coloration development, said process comprising subjecting the hard cooked eggs to radio frequency energy in the range of about 50 to about 100 megahertz to raise the temperature of the eggs to about 180°F.

2. Method according to claim 1, wherein the eggs are in the form of chopped, sliced or deviled eggs.

3. Method according to claim 1 wherein said eggs are in the form of peeled whole eggs.

* * * * *